(12) United States Patent
Nakane et al.

(10) Patent No.: US 6,499,803 B2
(45) Date of Patent: Dec. 31, 2002

(54) LUMBAR SUPPORT DEVICE

(75) Inventors: Hidetoshi Nakane, Toyota (JP); Shingo Fujiwara, Kariya (JP); Kouji Miyake, Chiryu (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/820,860

(22) Filed: Mar. 30, 2001

(65) Prior Publication Data

US 2001/0043002 A1 Nov. 22, 2001

(30) Foreign Application Priority Data

Mar. 30, 2000 (JP) ........................................ 2000-094619

(51) Int. Cl.[7] .............................................. A47C 3/025
(52) U.S. Cl. .................................. 297/284.4; 297/284.1
(58) Field of Search ........................... 297/284.1, 284.2, 297/284.3, 284.4, 362.11, 452.49, 452.52, 452.53, 452.34, 452.35

(56) References Cited

U.S. PATENT DOCUMENTS

| 4,576,410 A | * | 3/1986 | Hattori ..................... 297/284.4 |
| 5,641,205 A | * | 6/1997 | Schmidt .............. 297/284.4 X |
| 5,823,620 A | * | 10/1998 | Le Caz ..................... 297/284.4 |
| 5,988,745 A | * | 11/1999 | Deceuninck ............. 297/284.4 |
| 6,068,336 A | * | 5/2000 | Schonauer ........... 297/284.4 X |
| 6,152,531 A | * | 11/2000 | Deceuninck ............. 297/284.4 |

FOREIGN PATENT DOCUMENTS

| GB | 2 316 604 | 3/1996 |
| JP | 55-136356 | 9/1980 |

* cited by examiner

*Primary Examiner*—Peter M. Cuomo
*Assistant Examiner*—Stephen Vu
(74) *Attorney, Agent, or Firm*—Burns, Doane, Swecker & Mathis, LLP

(57) ABSTRACT

A lumbar support device for adjusting the position of the portion of the seating surface of a seat back corresponding to an occupant's lumbar region includes a frame member, a plane spring body provided with linear spring elements and supported on the frame member by hanger springs, and an adjusting mechanism for adjusting the position of the plane spring body. The adjusting mechanism adjusts the plane spring body position via torsion springs which has a relatively large spring constant. The load associated with the occupant's weight is shared by the hanger springs and the torsion springs. The linear spring elements corresponding to the occupant's lumbar region can be extended by a small outward shift or movement of the plane spring body. Therefore, this lumbar support device imparts a good supporting feeling to the occupant.

20 Claims, 4 Drawing Sheets

LUMBAR SUPPORT DEVICE

This application is based on and claims priority under 35 U.S.C. § 119 with respect to Japanese Application No. 2000-094619 filed on Mar. 30, 2000, the entire content of which is incorporated herein by reference.

FIELD OF THE INVENTION

This invention generally relates to vehicle seats. More particularly, the present invention pertains to a lumbar support device in the seat back of a vehicle seat for supporting an occupant's lumbar region.

BACKGROUND OF THE INVENTION

UK Patent GB2316604 published in 1998 discloses a lumbar support device for a vehicle seat. The disclosed lumbar support device is accommodated in the seat back of the vehicle seat and includes an approximately inverse or upside down U-shaped seat back frame (a seat frame), a plane spring body disposed within the inverse U-shaped seat frame, and a plurality of wire links stretched between the seat frame and an outer peripheral frame portion of the plane spring body. The wire links suspend the plane spring body with respect to the seat frame for supporting a load from the occupant's weight.

The lumbar support device also includes a manually operable mechanism for adjusting the tension applied to the wire links that are engaged with the seat frame at a position corresponding to an occupant's lumbar region. Therefore, the portion of the seating surface corresponding to the occupant's lumbar region can be adjusted rearward and forward by operation of the adjusting mechanism. When an operation force is applied to outwardly pull the wire links which suspend the plane spring body, the increase in the tension of the wire links causes the wire links to approach a parallel position with the plane spring body. However, by virtue of the construction of the support device, increasing the operation force applied to the wire links increases does not significantly increase the force component for pushing the plane spring body toward the occupant's lumbar region. Therefore, the lumbar support device is not able to provide a good operational feeling to the occupant at its forward position. Also, due to the construction of the support device, the lumbar support device cannot exert sufficient stiffness for maintaining the seating surface at the forward position.

A need thus exists for an improved vehicle seat lumbar support device for supporting an occupant's lumbar region.

SUMMARY OF THE INVENTION

According to one aspect of the invention, a lumbar support device for a vehicle seat includes a seat back that is adapted to support an occupant of the vehicle seat, a seat back frame provided in the seat back and including a pair of side frames and an end frame portion connected to each side frame, a plane spring body disposed within the seat back frame, a plurality of hanger springs disposed between the plane spring body and the seat back frame to suspend the plane spring body from the seat back frame, a driving device for moving a part of the plane spring body in the rearward and forward directions of the seat back, and a housing secured to at least one of the side frames. A link mechanism that is rotatably supported by a shaft fixed to the housing includes first and second arm portions extending away from the shaft. One end of the first arm portion is pivotally connected to the plane spring body and one end of the second arm portion is engaged with the driving device.

According to another aspect of the invention, a vehicle seat includes a seat cushion, a seat back having a front surface, an outer frame member positioned in the seat back, an inner frame member positioned within the outer frame member and supported on the outer frame member by a plurality of springs, a shaft mounted within the seat cushion, a torsion spring rotatably mounted for rotation relative to the shaft, the torsion spring including an arm that engages one of the side frame members, and a motor operatively connected to the torsion spring to rotate the torsion spring and the arm to cause the inner frame member to move in a direction toward the front surface of the seat back.

According to a further aspect of the invention, a lumbar support device for a vehicle seat includes a frame member positionable in a seat back of a vehicle seat, a spring body supported on the frame member and being comprised of side frame portions and at least one spring element extending between the side frame portions, and an arm rotatably positioned on a shaft that is mounted in a housing, with the arm being connected to one of the side frame portions. A driving device is operatively connected to the arm to rotate the arm and move the spring body in a forward direction to change the degree of lumbar support.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
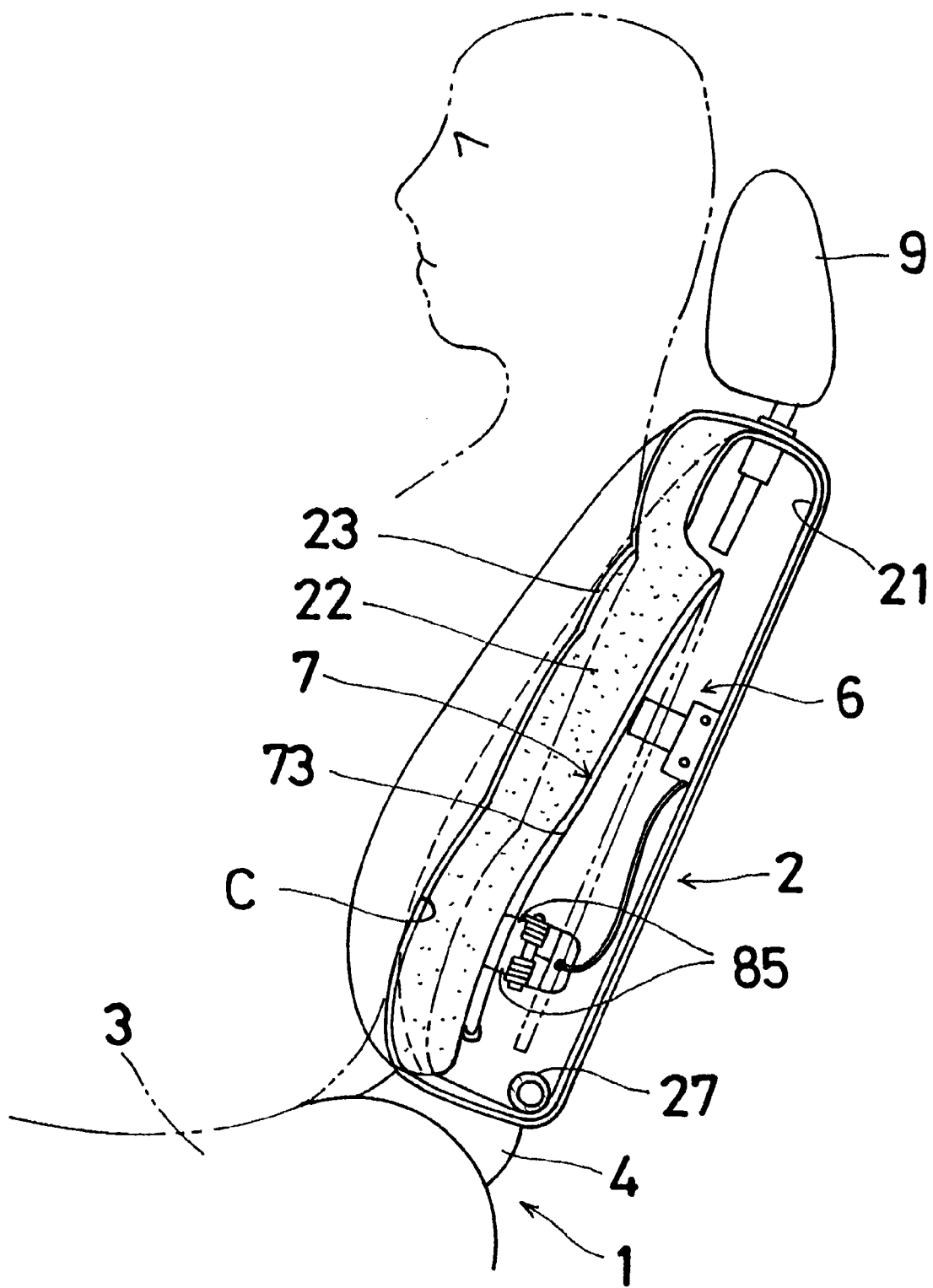
FIG. 1 is a side view of a vehicle seat including a lumbar support device according to the present invention.
Figure 2:
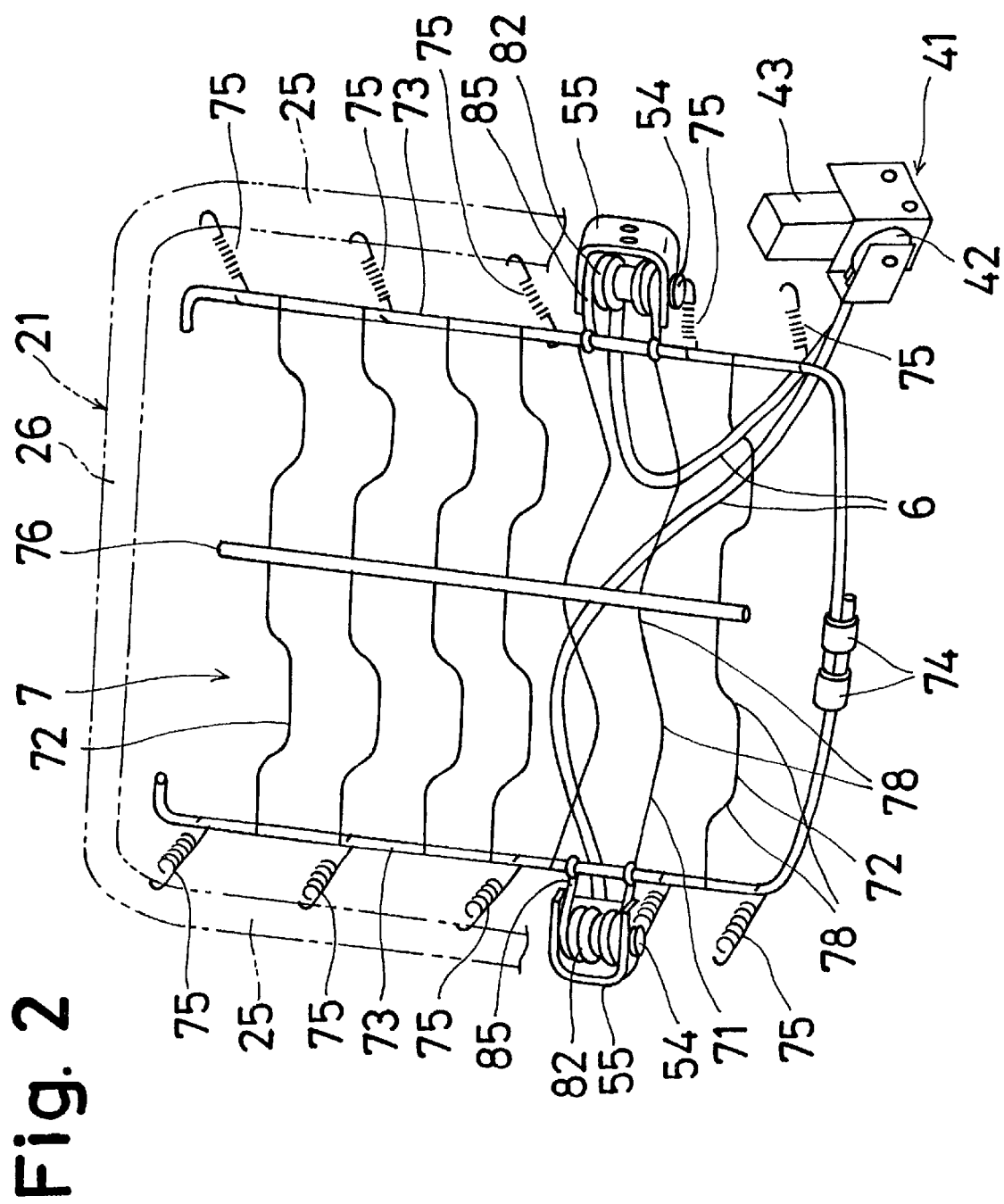
FIG. 2 is a perspective view of the plane spring body and adjusting mechanism forming a part of the lumbar support device according to the present invention.

Referring initially to FIGS. 1 and 2, the lumbar support device of the present invention is provided in a seat 1 of a vehicle. The vehicle seat 1 includes a seat cushion 3, a hinge apparatus 4, a head rest 9 and a seat back 2. The head rest 9 is connected to the upper portion of the seat back 2. The hinge apparatus 4 is disposed between the seat back 2 and the seat cushion 3 for adjusting the angle of the seat back 2 relative to the seat cushion 3.

The outside of the seat back 2 is covered to provide the seat back 2 with an outer surface 23. The inside of the sear back 2 includes a seat back frame 21 serving as a reinforcement member. As shown in FIG. 2, the seat back frame 21 is in the form of an approximately inverse or upside-down U-shaped frame with a pair of upright or generally vertical side frame portions 25 and an upper horizontal frame portion 26 connected to the upper end of each of the upright side frame portions 25. The lower ends of the upright side frame portions 25 are preferably welded to an auxiliary reinforcement member 27.

A plane spring body 7 is disposed in an inner space of the inverse seat back frame 21 so that the plane spring body 7 is generally surrounded by the seat back frame 21. The plane spring body 7 includes a pair of symmetrical L-shaped side frames 73 that together define a generally U-shaped frame. The side frames 73 can be made of steel and possess a circular cross-section. At the bottom of the U-shaped frame, the side frames 73, 73 overlap one another and are fixedly coupled to one another by clip members 74.

The plane spring body 7 is mounted and suspended on the seat back frame 21 by a plurality of hanger springs 75. One end of each of the hanger springs 75 is hooked to or otherwise connected to one of the upright side frame portions 25 and the other end of each of the hanger springs 75 is engaged with one of the side frames 73.

Two types of linear spring elements forming first and second linear spring elements 71, 72 extend generally horizontally in a transverse manner between the upright side frames of the frame portion 73. The first and second linear spring elements 71, 72 are made from steel wire and each include a plurality of bent points 78. A spacer 76 extends in the vertical direction of the U-shaped frame at the mid points of the linear spring elements 71, 72. The spacer 76, which can be a linen made supporter that is wrapped with craft paper, is inserted into and penetrated by the linear spring elements 71, 72. The spacer 76 thus retains substantially uniform longitudinal spacing between the linear spring elements 71, 72. That is, the spaces between the spring elements 71, 72 are kept generally uniform under the load applied to a seat cushion pad 22 which is disposed between the plane spring body 7 and the cover forming the outer surface 23 of the seat.

In the illustrated embodiment, two of the first linear spring elements 71 extend between the upright portions of the frames 73 of the plane spring body 7 at positions corresponding to the occupant's lumbar region. In addition, five of the second linear spring elements 72 are arranged at other parts of the plane spring body 7. As noted above, a number of bent points 78 are provided along the length of each of the first and second linear spring elements 71, 72. The first linear spring elements 71 each have a lesser number of bent points 78 than the second linear spring elements 72. In the illustrated embodiment, the first linear spring elements 71 each have three bent points 78 and the second linear spring elements 72 each have eight bent points. Thus, the length of wire forming each first linear spring element 71 is shorter than the length of wire forming each of the second linear spring elements 72. This means that each of the first linear spring elements 71 can be fully extended by a smaller displacement of its ends in the transverse direction as compared to the second linear spring elements 72. In addition, when fully extended, the first linear spring elements 71 have substantially no elastic characteristics and are thus able to apply a stiffened support feeling for the seat occupant's lumbar region.

Figure 3:
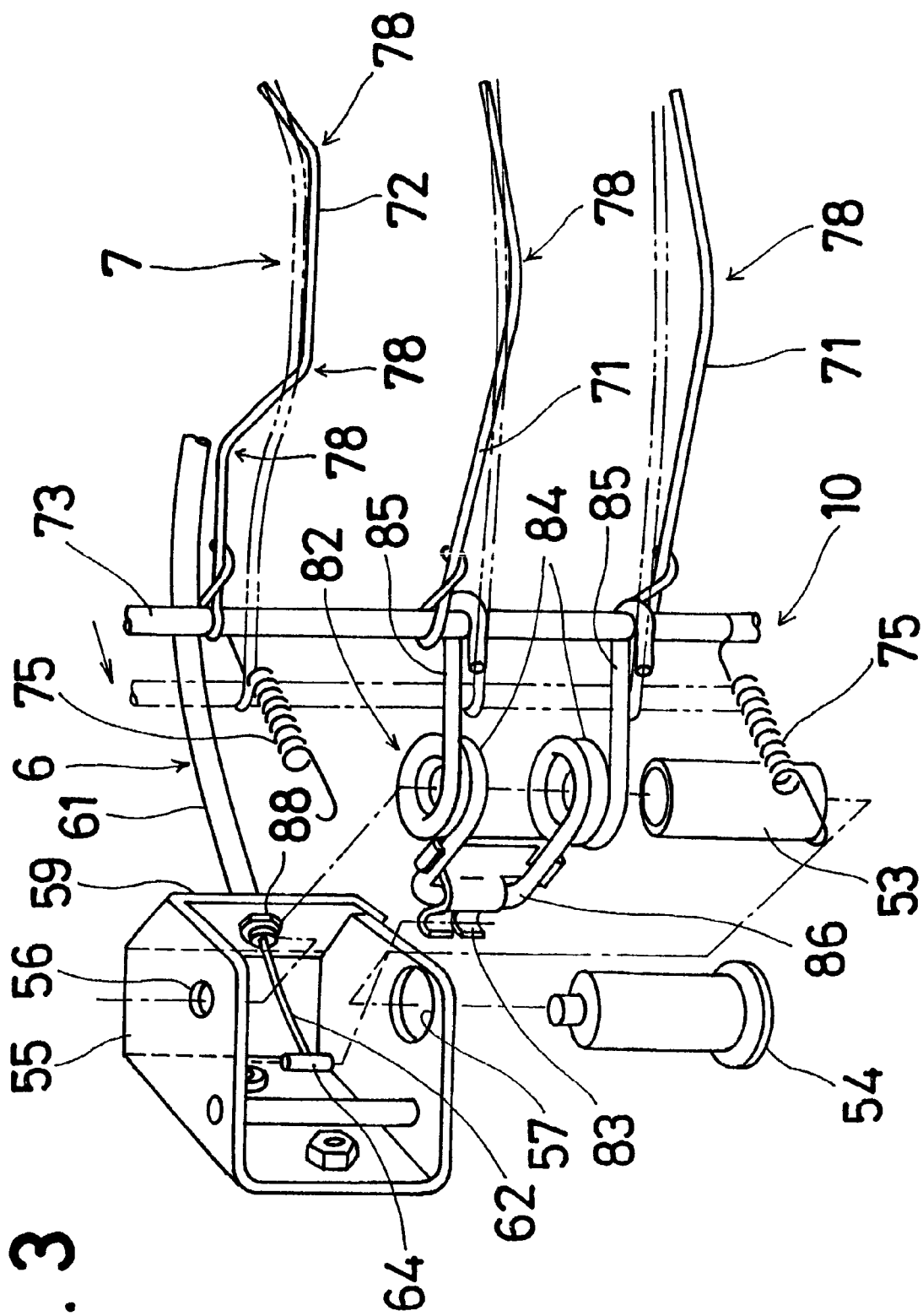
FIG. 3 is a perspective view of a portion of the plane spring body and adjusting mechanism shown in FIG. 2.
Figure 4:
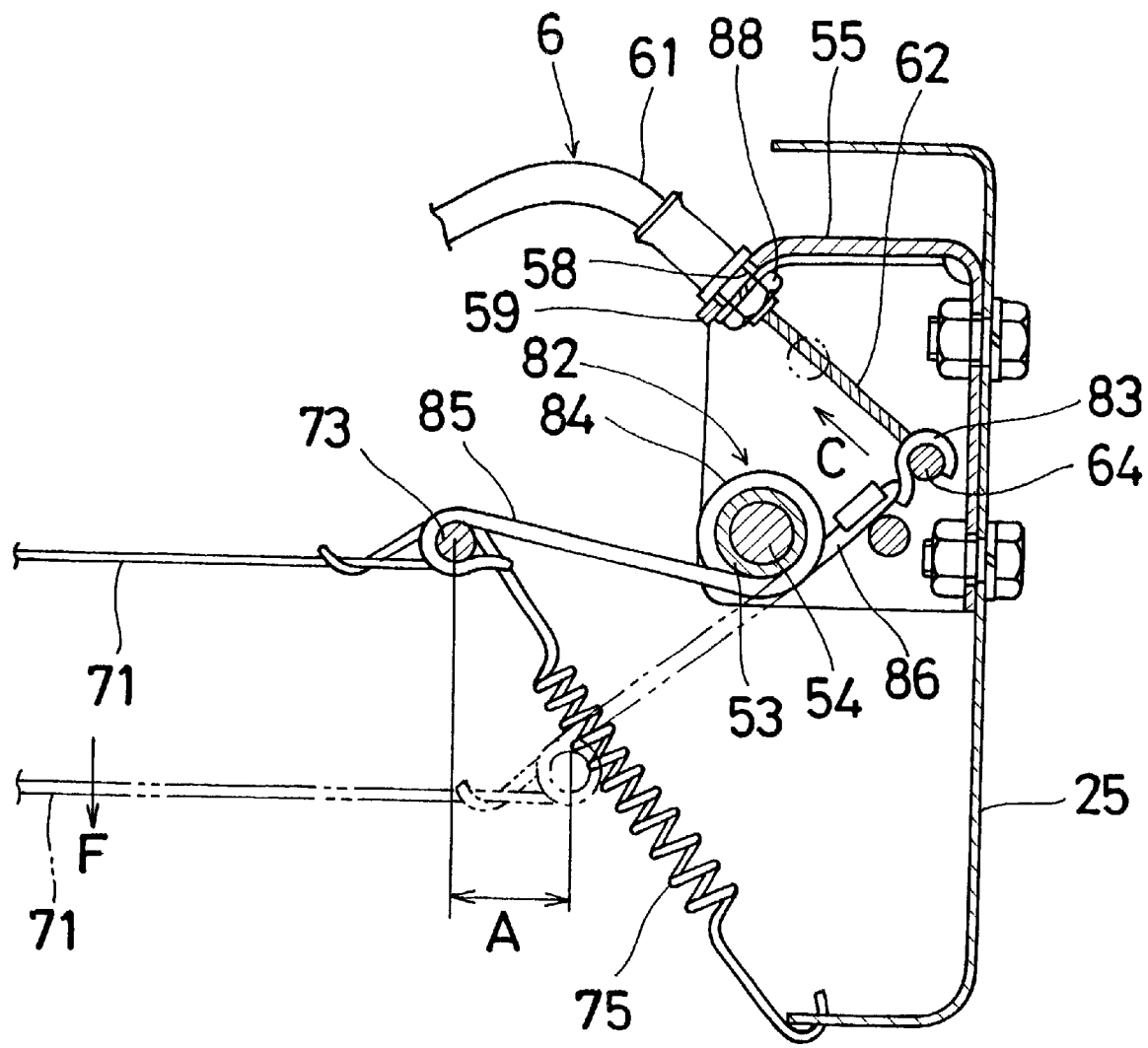
FIG. 4 is a cross-sectional view of a portion of the adjusting mechanism shown in FIG. 3.

As shown in FIGS. 2–4, an adjustment mechanism of the lumbar support device 10 is positioned on each side of the frame portion 7. The adjusting mechanisms are each operatively connected to the upright portion of one of the side frames 73 of the frame portion 7. The two adjustment mechanisms are similarly constructed and the following description applies equally to both adjusting mechanisms.

Each adjusting mechanism of the lumbar support device 10 includes a torsion spring 82 connected to the vertical portion of the side frame 73 at approximately the same location as the first linear spring elements 71. The torsion spring 82 is preferably made from wire material and includes two spaced apart coil portions 84, two spaced apart parallel first arm portions 85, and a second arm portion 86.

The two parallel first arm portions 85 extend inwardly toward the vertical side frame 73 from the coil portions 84. One of the upper first arm portions 85 (i.e., the upper first arm portion) extends from the top end of one coil portion 84 (i.e., the upper coil portion) while the other first arm portion 85 (i.e., the lower first arm portion) extends from the bottom end of the other coil portion 84 (i.e., the lower coil portion). The free end portion of each first arm portion 85 engages (e.g., is pivotally wound around) the frame portion 73 which has a round cross-sectional shape.

The second arm portion 86 is generally U-shaped and extends between and connects the two coil portions 84, 84. The second arm portion 86 thus extends from the bottom end of the upper coil portion 84 to the top end of the lower coil portion 84. The second arm portion 86 extends from the coil portions 84 in a direction outwardly away from the vertical side frame 73. A plate-like element provided with a hook 83 is fixed to the second arm portion 86.

Furthermore, as shown in FIGS. 3 and 4, a housing 55 is fixed by screws to the upright side frame portion 25 of the seat back frame 21. As shown in FIG. 3, the housing 55 includes an upper wall provided with a hole 56 and a bottom wall provided with a hole 57. A cylindrical collar 53 is positioned in the coil portions 84 of the torsion spring 82. The collar 53 is supported on a shaft 54 and the holes 56, 57 of the housing 55 receive the ends of the shaft 54 in the manner shown in FIG. 2. The top end of the shaft 54 can be fixedly riveted into the hole 56 on the upper wall of the housing 55. By way of this construction, the torsion spring 82 is rotatably mounted with respect to the housing 55 and is rotatable around the axis of the shaft 54.

As shown in FIG. 4, the adjusting mechanism also includes a force transmitting device 6 defined by an outer cover 61 and a wire element 62. One end of the outer cover 61 is fixed in a hole 58 formed on a vertical wall 59 of the housing 55 by a nut 88. The wire element 62 is adapted to slidably move within the outer cover 61 in the longitudinal direction of the outer cover 61. One end of the wire element 62 is provided with a fixture 64. This fixture 64 can be configured to possess a generally cylindrical form and can be positioned so that the axis of the fixture 64 is perpendicular to the wire element 62. The fixture 64 is rotatably connected to the hook 83, for example by virtue of the hook 83 being wrapped around the fixture 64.

As also shown in FIG. 4, when the wire element 62 is pulled, the fixture 64 is adapted to be moved in the direction indicated by the arrow C relative to the cover 61. When the wire element 62 is pulled in the direction indicated by the arrow C in FIG. 4, the corresponding movement of the fixture 64 pulls the second arm portion 86 of the torsion spring 82 by virtue of the connection with the hoof 83, thus causing the second arm portion 86 to rotate around the axis of the shaft 54. In addition, the rotation of the second arm portion 86 is transmitted to the first arm portions 85 by way of the coil portions 84, 84 and so the first arm portions 85 also rotate, thus causing forward movement of the side frame 73 in the direction of the arrow F in FIG. 4.

Thus, as can be seen, the rotation of the first arm portion 85, 85 results in movement of the side frame 73 in the forward direction (i.e., in the direction of the seat occupant) as well as a slight outward (i.e., lateral) movement or pulling of the side frame 73. The solid line representation of the first linear spring elements 71 and the side frame 73 shown in FIGS. 3 and 4 indicate the position of the spring elements 71 and the side frame 73 when the seating surface of the seat back 2 is at the rear most position. The two-dotted line representations of the first linear spring elements 71 and the side frame 73 shown in FIGS. 3 and 4 indicate the adjusted position of spring elements 71 and the side frame 73 when the seating surface of the seat back 2 is at the forward most position. The adjusting mechanism of the lumbar support device 10 can vary the position of the spring elements 71 and the side frame 73 in the region between the solid line position and the two-dotted line position shown in FIGS. 3 and 4.

The adjusting mechanism forming a part of the lumbar support device 10 of the present invention also includes a driving device 41. This driving device 41 is attached at an appropriate portion of the seat back frame 21 by screws or other suitable securing devices. As shown in FIG. 2, the end of the wire element 62 that is opposite the fixture 64 is operatively engaged with the driving device 41. The driving device 41 includes a wire retractor 42 and an electrical motor unit 43 with a reduction gear. The end of the wire element 62 that is opposite the fixture 64 engages the wire retractor 42. Therefor, when the occupant appropriately effects operation of the motor unit 43 (e.g., by operating a switch), the wire portion 62 is operated (i.e., either pulled or released) and the seating surface moves forwardly or is able to move rearwardly. When the motor unit 43 is actuated to move the plane spring body 7 in the forward direction to increase the lumbar support, the wire portion 62 is pulled to rotate the first arm portions 85, 85 and thus move the plane spring body 7 in the forward direction. When the plane spring body 7 has been moved to the desired position to change the degree of lumbar support, the motor unit 43 can be turned off to stop the wire retractor 42 which then steadily holds the wire portion 62.

As shown in FIG. 4 and described above, the two-dotted line position of the first linear spring elements 71 and the first arm portions 85 of the torsion spring 82 indicates the positions of the first linear spring elements 71 and the first arm portions 85 when the seating surface is pushed to the forward most position by the lumbar support device 10. In accordance with the pulling and releasing operation of the wire element 62, the position of the linear spring portion 71 is adjusted to any desired position approximately in the region between the two-dotted line position and the solid line position.

As shown in FIG. 1, the seat back 2 includes the seat cushion pad 22 formed from urethane foam. The seat cushion pad 22 is disposed adjacent to the plane spring body 7. The seat cushion pad 22 is entirely covered by the cover forming the outer surface 23 with tension applied thereto.

The torsion spring 82 exerts a spring force upon relative movement of the first arm portions 85 and the second arm portion 86. The load from the occupant's weight applied to the plane spring body 7 is shared by the hanger springs 75 and the torsion spring 82. The spring constant of the torsion spring 82 is preferably set to be far larger than that of the hanger springs 75. Accordingly, the torsion spring 82 effectively minimizes the rearward retraction of the plane spring body 7. Owning to the tension applied by the outer surface 23, the forward most position of the first linear spring elements 71 may be slightly behind or displaced from the forward most position shown by the two-dotted line position in FIG. 4.

When the occupant's weight is applied to the plane spring body 7 via the seat cushion pad 22, the load associated with the occupant's weight is transferred at least in part by the hanger springs 75 to the seat back frame 21. Also, the engagement of the torsion spring 82 with the plane spring body 7 at the noted locations causes the load from the occupant's weight to also be transferred to the seat back frame 21 by the torsion spring 82. Since the spring constant of the torsion spring 82 is set to be far larger than that of the hanger springs 75, most of the load at the occupant's lumbar region is transferred principally by the torsion spring 82 rather than by the hanger springs 75. This mechanism effectively works to inhibit retraction or rearward movement of the seating surface once the seating surface is moved in the forward direction.

As an alternative to the use of the torsion spring, the present invention can also employ relatively rigid links provided with what is essentially a maximum spring constant. These rigid links can support substantially all of the load of the occupant's lumbar region, thus effecting significant lumbar support to maintain the adjusted seat surface position. In such an alternative construction, consideration should be given to, for example, reinforcing the lumbar support device or frame portions where the lumbar support device is attached, because those members receive relatively significant concentrated load.

When the lumbar support device 10 is located at the rear most position, with the first linear spring elements 71 positioned in the solid line position shown in FIG. 4, the axis of the torsion spring 82 and the points of connection of the first arm portions 85 with the frame potion 73 are substantially aligned on a common plane with the plane of the plane spring body 7. Then, upon operation of the adjusting mechanism, the first arm portions 85 are rotated to push the seating surface 23 of the seat back 2 forward, whereupon the engaging points of the first arm portions 85 and the frame portion 73 shift forward and also laterally as can be seen from a comparison of the dotted line and solid line positions shown in FIG. 4.

FIG. 4 shows only one side of the lumbar support device 10 of the seat back 2, although as noted above it is to be understood that another torsion spring 82 is secured on the other side as well. The points of engagement of the first arm portions 85 with the side frames 73 on both sides are shifted outwardly relative to each other. This causes outward shifting of both ends of the first linear spring elements 71 causes the spring portion 71 to be extended (e.g., fully extended) and relatively stiff. The extended first linear spring elements 71 and the torsion springs 82 which possess relatively large spring constants are advantageously able to provide a good lumbar supporting feeling.

In the illustrated and described embodiment, the cover on the seat back 2 forming the outer surface 23 applies a tension to the wire portion 62. This tension is applied even when the plane spring body 7 is at the solid line position shown in FIG. 4 and even when there is no occupant in the seat. Thus, assuming the plane spring body 7 is located at the forward most position or at a location between the forward most position and the rearward most position, when the wire element 62 is released by the wire retractor 42 (e.g., through suitable operation of the motor unit), the plane spring body 7 moves in the rearward direction by the tension force associated with the seat back cover. If an occupant is seated on the seat, the occupant's weight can also contribute to moving the plane spring body 7 in the rearward direction.

Thus, in accordance with the present invention, the plane spring body 7 can be moved in the forward direction (i.e., towards the two-dotted line position in FIG. 4) by actuating the motor unit 43 to operate the wire retractor 42 and cause the wire portion 62 to be pulled by the wire retractor 42. This pulling movement of the wire portion 62 causes the link mechanism 82 to rotate, thus moving the plane spring body 7. To stop the movement of the plane spring body 7, the motor 43 is turned off, thus causing the wire retractor 42 to stop pulling the wire portion 62. The wire retractor 42 thus holds the wire portion 62 at such position. Assuming the plane spring body 7 has been moved forward to some extent (i.e., has been moved towards the two-dotted line position in FIG. 4), to move the plane spring body 7 in the rearward direction (i.e., back towards the solid line position in FIG. 4), the motor unit 43 can be operated to cause the wire retractor 42 to release the wire portion 62. Once the wire portion 62 has been released by the wire retractor 42, the plane spring body 7 is able to move in the rearward direction under the tension force associated with the cover of the seat back (i.e., the cover that forms the outer surface 23), and also the weight of the seat occupant to the extent an occupant is seated on the seat.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat comprising:

a seat cushion;

a seat back having a front surface;

an outer frame member positioned in the seat back;

an inner frame member positioned within the outer frame member and supported on the outer frame member by a plurality of springs;

a shaft mounted within the outer frame member;

a torsion spring rotatably mounted for rotation relative to the shaft, the torsion spring including an arm that engages the inner frame member; and a motor operatively connected to the torsion spring to rotate the torsion spring and the arm to cause the inner frame member to move in a direction toward the front surface of the seat back.

2. The vehicle seat according to claim 1, including a plurality of linear spring elements extending across the inner frame member.

3. The vehicle seat according to claim 1, including a pair of spaced apart torsion springs and an arm extending from each of the torsion springs, each said arm engaging the inner frame member.

4. The vehicle seat according to claim 3, wherein the torsion springs are connected to one another by an additional arm.

5. The vehicle seat according to claim 1, wherein said arm is a first arm and including a second arm extending from the torsion spring, and including a wire element extending between the second arm and the motor to operatively connect the motor to the torsion spring.

6. A lumbar support device for a vehicle seat, comprising:

a seat back for supporting an occupant of the vehicle seat;

a seat back frame provided in the seat back and including a pair of side frames and an end frame portion connected to each side frame;

a plane spring body disposed within the seat back frame;

a plurality of hanger springs disposed between the plane spring body and the seat back frame to suspend the plane spring body from the seat back frame;

a driving device for moving a part of the plane spring body in rearward and forward directions of the seat back;

a housing secured to at least one of the side frames;

a link mechanism rotatably supported by a shaft fixed to the housing and including a first arm portion extending away from the shaft, one end of the first arm portion being pivotally connected with the plane spring body, and a second arm portion extending away from the shaft, one end of the second arm portion being engaged with the driving device.

7. The lumbar support device according to claim 6, wherein the link mechanism includes at least one torsion spring disposed between the first and second arm portions and exerting a spring force between the first arm portion and the second arm portion.

8. The lumbar support device according to claim 6, wherein the plane spring body includes at least one first linear spring element arranged at a part of the plane spring body corresponding to a lumbar region of the occupant and a plurality of second linear spring elements arranged at other parts of the plane spring body, each of the first and second linear spring elements being made from wire and possessing a plurality of bent points, wherein the number of bent points on the at least one first linear spring element is less the number of bent points on each of the second linear spring elements, and the wire forming the first linear spring element being shorter than the wire forming the second linear spring element.

9. The lumbar support device according to claim 6, including a torsion spring disposed between the first and second arm portions.

10. The lumbar support device according to claim 9, including a sleeve rotatably mounted on the shaft, the torsion spring being mounted on the sleeve.

11. The lumbar support device according to claim 6, including two spaced apart first arm portions each connected to the second arm portion by way of a respective torsion spring.

12. The lumbar support device according to claim 11, wherein each of the torsion springs is rotatably positioned about the shaft.

13. A lumbar support device for a vehicle seat, comprising:

a frame member positionable in a seat back of a vehicle seat;

a spring body supported on the frame member, the spring body including side frame portions and at least one spring element extending between the side frame portions;

an arm rotatably positioned on a shaft that is mounted in a housing, the arm being connected to one of the side frame portions; and a driving device operatively connected to the arm to rotate the arm and move the spring body in a forward direction as well as a lateral direction to change a degree of lumbar support.

14. The lumbar support device according to claim 13, wherein the side frame portions forming the spring body are connected together.

15. The lumbar support device according to claim 13, wherein the arm extends from a torsion spring.

16. The lumbar support device according to claim 15, wherein the torsion spring is rotatably disposed about the shaft.

17. The lumbar support device according to claim 13, including two arms each extending from a respective torsion spring.

18. The lumbar support device according to claim 17, wherein the two arms are first arms, and including a second arm connecting the torsion springs to one another.

19. The lumbar support device according to claim 18, wherein the driving device is connected to the second arm.

20. The lumbar support device according to claim 13, wherein the driving device is a motor, and including a wire element operatively engaged with both the arm and the motor.

* * * * *